Aug. 12, 1952     O. K. KELLEY     2,606,460
COMBINED TRANSMISSION
Filed Nov. 29, 1944     4 Sheets-Sheet 4
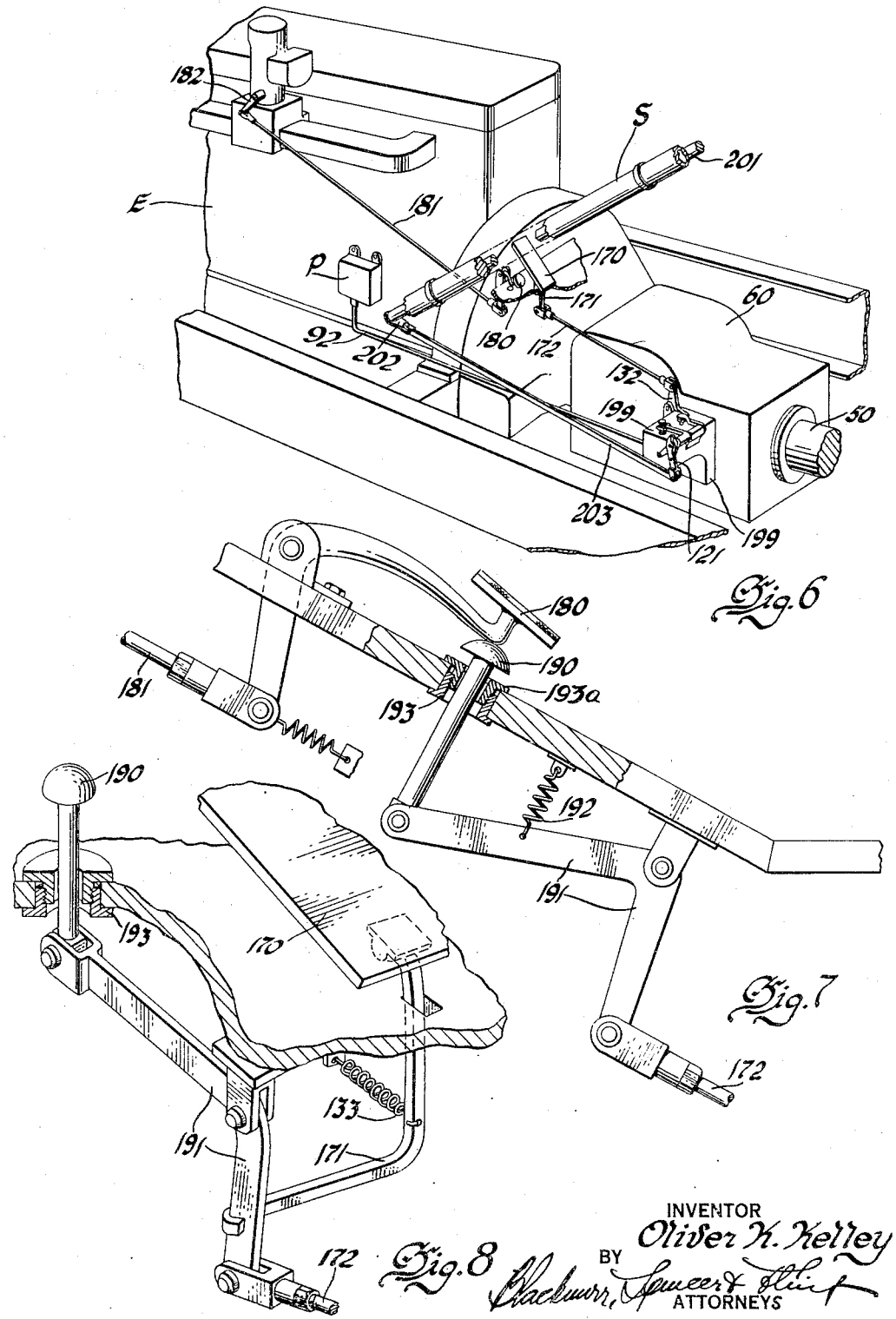
INVENTOR
Oliver K. Kelley
BY
Blackmore, Spencer & Flint
ATTORNEYS Patented Aug. 12, 1952

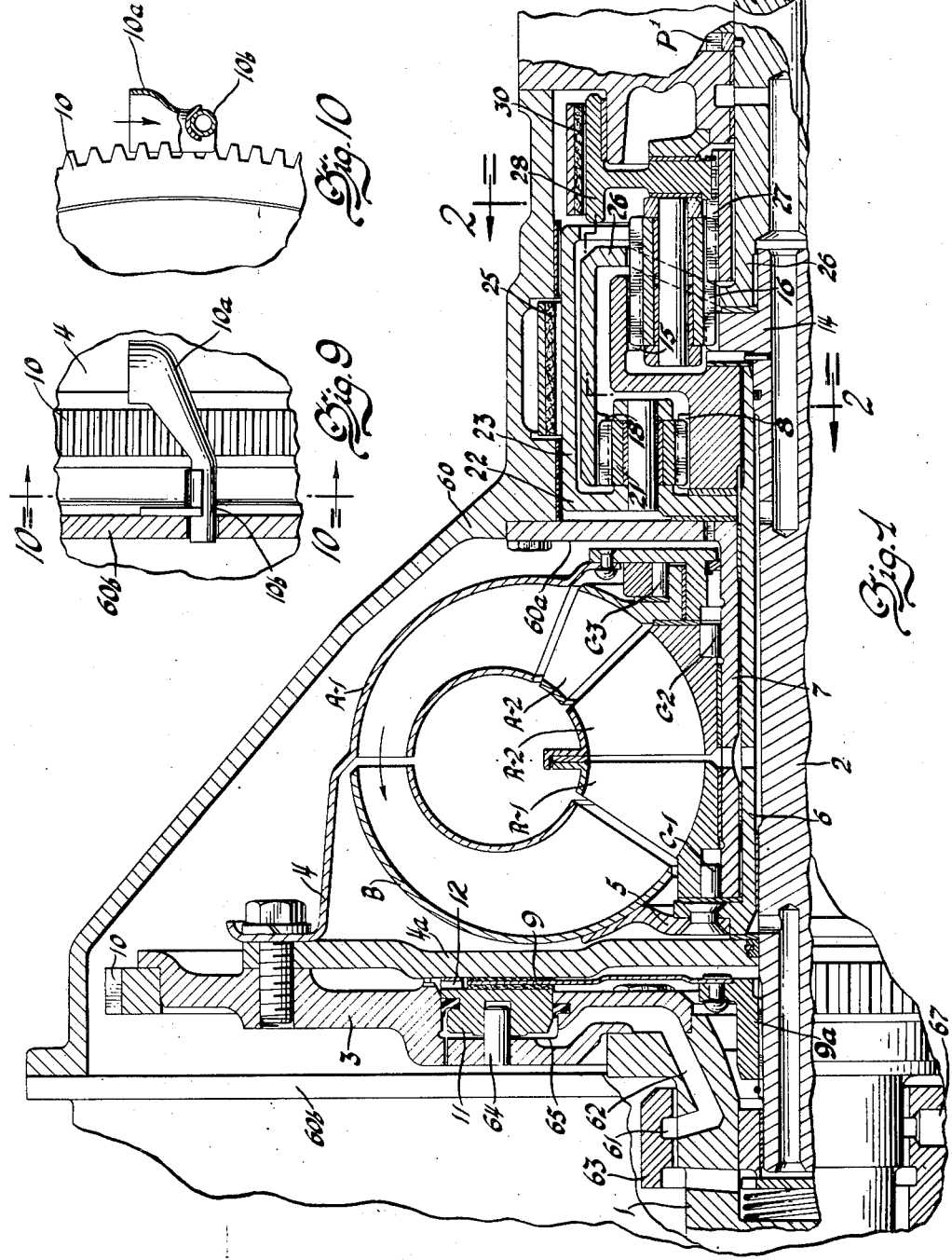

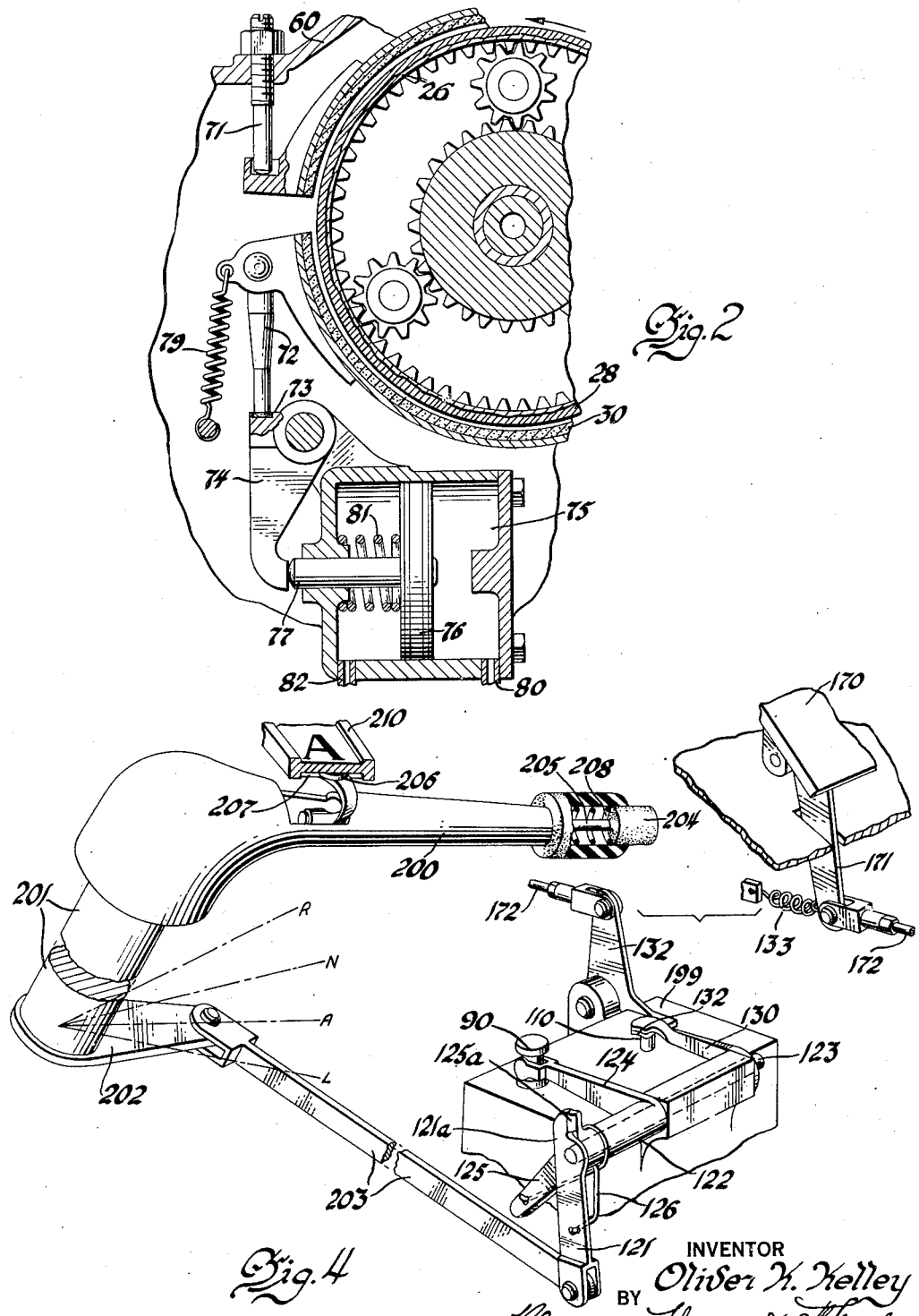

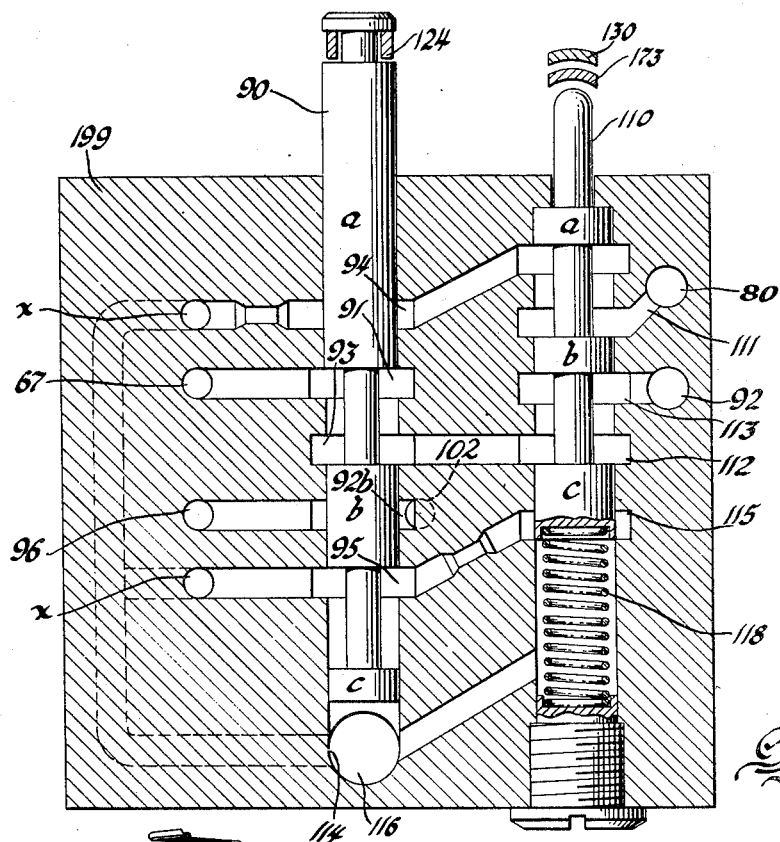
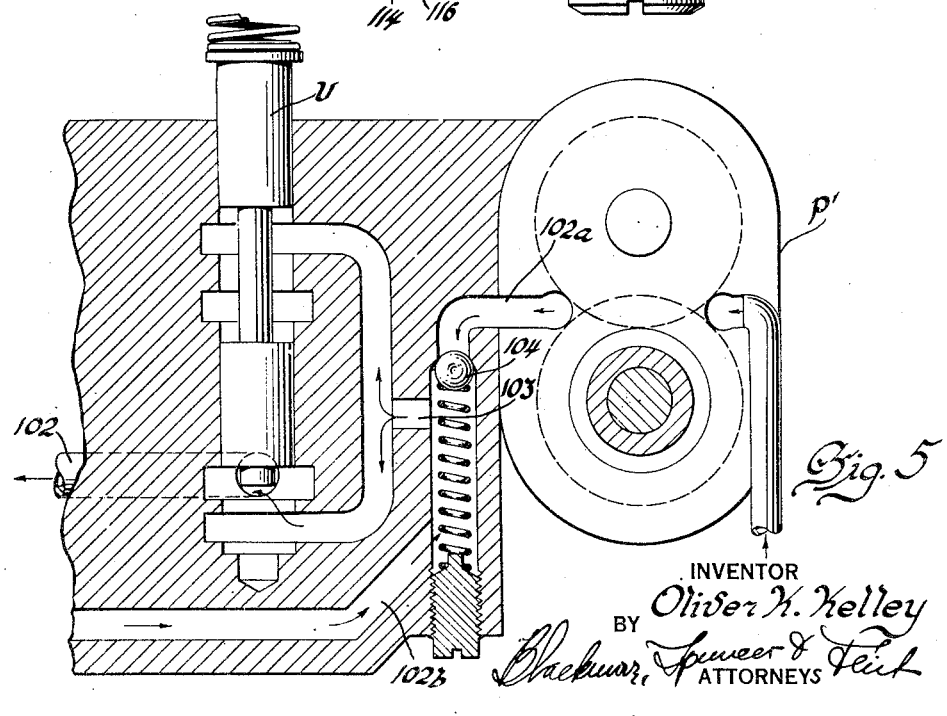

2,606,460

UNITED STATES PATENT OFFICE 2,606,460

COMBINED TRANSMISSION

Oliver K. Kelley, Birmingham, Mich., assignor to General Motors Corporation, Detroit, Mich., a corporation of Delaware Application November 29, 1944, Serial No. 565,592

23 Claims. (Cl. 74—732)

The invention relates to driving gear and more particularly to types in which combined positive gear and fluid drive is utilized. The field of art lies in what is known as split torque gearing, and the problems solved pertain to division of and recombining of torque, for obtaining desired ranges of efficient drive speeds, in which the overall ratios are infinitely variable.

It is a principal object of the invention to combine a fluid, torque-multiplying unit with gearing so arranged that a wide variable speed and torque range will be available, inherently automatic in accordance with speed and torque, with forward drive obtainable by engagement of a coupling clutch located in one of the divided torque paths; and to provide an emergency or auxiliary low gear drive through the fluid unit, obtainable by release of the coupling clutch with locking of a gear reaction element to complete the reduction path of torque through the fluid unit and the gear unit. It is also an object of the invention to provide a reverse drive from the output of the fluid unit, obtainable by release of the coupling clutch or the auxiliary low reaction element, and engagement of a single separate reverse reaction element.

It is a further object of the invention to couple the gear elements for reverse and forward drive so that the normal combined coupling for forward automatic drive occurs within the elements of one gear group; the coupling for auxiliary low gear drive occurs between elements of the same gear group by means of a reaction element of this group, while reverse drive coupling is confined entirely within a second gear group. This arrangement avoids undesirable gearing friction losses normally encountered in so-called split-torque drives.

It is an object of the invention to provide a ready and easy selection of low series reduction gear drive with release of one of the divided drive torque paths, by a simple control which alternates the engagement of the said coupling clutch and said forward reaction locking brake. As will be understood further, this is obtained by directing fluid pressure alternately to actuator means for the clutch and brake. The no-drive condition for neutral is merely established by the absence of fluid pressure, simplifying the control action required.

An additional object is the provision of multiple rotors in a fluid torque converter referred to above as a fluid unit, so that a useful reduction of normal fluid losses is had, due to the arrangement of auxiliary vane wheels in a particular flow sequence of the torque-transmitting fluid, an auxiliary rotor or wheel being equipped with a one-way clutch for individual release from connection with its primary wheel for free running under certain driving conditions. An added object is to utilize multiple reaction wheels, individually coupled to the casing of the drive mechanism by one-way clutches so that each may establish reaction or run free at different speed points.

A further object is to provide a cooperative control for the torque sustaining elements involved in the parallel and series drive so that alternation of these drive conditions by the control is obtained with uninterrupted torque by virtue of the cooperative relationship between the torque factors of the drive elements and the timing of the actuation means subject to the control, for obtaining wholly smooth transitions between parallel and series drive.

The advantages of the described drive device are manifold. First, it enables the designer to compress a large torque-handling capacity into a small volumetric space, creating a great saving in vehicles where space considerations for freight and passengers are extremely important. Second, the controls required for all driving conditions are simplified so that the power plant including the drive mechanism, may be remote from the driver's station, and there is no need for intricate controls which transmit back to the driver any appreciable feel of the operational action of the drive clutches or other torque-supporting parts.

The foregoing objects will be found to have been accomplished in the device below described, and additional objects and advantages are likewise further stated in this description.

In addition to the foregoing stated advantages of the device of the invention, the following specification provides a description of further advantages set forth so that one skilled in the art may appreciate, understand and use the same.

Figure 1 is a side elevation in part section of the driving mechanism of the invention.

Figure 2 is a section in part, taken at line 2—2 of Figure 1, to show the operation of one of the brake actuators.

Figure 3 is a section taken through the valve body of the controls of the invention to show the relationships of the valving for the essential control operations.

Figure 4 is a composite view in part section projection of the manually operated controls extending from the driver's station to the valve body, conveniently mounted on the casing of the drive mechanism.

Figure 5 is a schematic view of a pump providing fluid servo pressure for the controlled actuation of the drive of the invention.

Figure 6 is a schematic projection view of the invention as installed in a vehicle with the hand lever control shaft shown attached to the vehicle steering column.

Figure 7 shows a modification of the control arrangements of Figures 4 and 6, in which the engine accelerator pedal at full stroke position, or beyond full throttle setting is arranged to compel the downshift of the drive mechanism to its lowest forward driving ratio. This may be used with the handlever control of Figure 4, without an auxiliary pedal, or an arrangement such as shown in Figure 8 which includes both the auxiliary shift pedal and the accelerator pedal connection, Fig. 8 being a schematic view of the modification controls.

Fig. 9 is a longitudinal, part-sectional view of a simple fluid feeding arrangement built into the casing for draining excess oil from the compartment of the fluid torque converter, and Fig. 10 is a transverse view of the arrangement of Fig. 9.

The input impeller A-1 of Fig. 1 is driven by overhanging drum 4 attached to the flywheel of variable speed engine shaft 1. The output rotor B is mounted on hub 5 rotating with hollow shaft 6 and with sun gear 8 of the reverse gear planetary group, and with annulus gear 15 of the forward drive gear group.

The reaction wheels R-1 and R-2 are arranged so that wheel R-1 is prevented from rotating reversely by roller clutch C-1, and wheel R-2 is prevented from backward rotation by roller clutch C-2, sleeve 7 being integral with or keyed to web 60a of casing 60.

The transmission shaft 2 is splined to hub 9a of clutch plate 9, gripped between the adjacent web 4a of flywheel 3 and presser plate 11, operable by fluid pressure and controlled by handlever, pedal or equivalent means. The shaft 2 carries at its rearward end sun gear 14 meshing with planet gears 16 externally as annulus 15 does internally.

Annulus gear 18 of the reverse drive unit meshes with planet gears 21 supported on carrier 22 having drum 23 upon which reverse brake band 25 may bear to stop rotation of carrier 22. Gear 18 is attached to output carrier 26 for the forward driving group, the planet gears 16 meshing with annulus 15, sun gear 14, and sun gear 27 attached to drum 28, brakable for forward reduction drive by band 30.

The impeller A-1 has roller clutch C-3 operative between A-1 and a sleeve portion of impeller A-2, arranged so that the impeller A-2 may rotate forward faster than A-1 but not lag behind it.

The brake 30 need only be occasionally used for normal driving, however with the engine running slowly or idling, the rotation of the impellers may not be sufficiently high for torque to be transmitted to rotor B, whether or not brake 30 be applied, and although clutch 9—11 be engaged.

Increased engine speed applies torque to rotor B, the direction of flow reaction causing reaction wheels R-1 and R-2 to endeavor to rotate reversely, but being held by roller clutches C-1 and C-2, the reaction wheels stand still, their blades imparting a torque multiplication component to the oil body being circulated by rotation of A-1 and of B.

When only clutch 9—11 is engaged, sun gear 14 has engine speed, and with output shaft 50 tending to stand still, the planet gears 16 are rotated reversely, tending to spin annulus 15, sun gear 8, sleeve 6 and rotor B backward.

As soon as an increment of torque is supplied by rotor B, annulus gear 15 tends to resist backward rotation and sets up a counteractive force, increasing with the rising capacity of the turbine unit, until the annulus gear 15 rotates substantially as fast as engine-connected sun gear 14, giving direct drive between shafts 1 and 50 except for a slight slip in the fluid unit. Gears 14 and 15 are mutually reactive. Gear groups such as the forward drive group, having two or more effective input-connected members are known as torque combining units.

If the engine speed is reduced, the sun gear 14 decelerates tending to drive the annulus 15 and rotor B forward faster, so that a coupling relationship obtains in the fluid unit, until the torque flows from the engine once more.

It should be noted that after the impeller A-1, A-2 and rotor B reach a given relative higher speed relationship above idling, the reaction rotors cease to receive a reaction component, and are coupled into the drive in the manner of the fluid flywheel. The reaction rotor R-2 is directly coupled by roller clutch C-2 to sleeve 7 and web 60a, and rotor R-1 is likewise coupled by clutch C-1 to the sleeve 7, so that the latter can exert an independent reaction torque effect whether or not C-2 locks R-2 against rotation.

The permitting of this differential rotation between the two adjacent reaction wheels R-1 and R-2 serves to reduce interstage shock losses, which result likewise obtains by the relationship of impeller A-2 to A-1, established by the freewheel clutches.

When extraordinary demand, as for hill climbing occurs, the brake 30 stops sun gear 27 forcing planet gears 16 to roll around it. For this drive, clutch 9—11 is disengaged, and the low gear drive is obtained from the fluid unit operating at an efficient reduction torque-speed ratio, and driving the gears, which provide further reduction.

Clutch 9—11 must be disengaged when brake 30 is fully applied, otherwise a locking couple would be set up in the gearing 14—16—27, since 27 would otherwise lock to sun gear 14.

The fluid unit causes sun gear 8 and annulus gear 15 to rotate at some reduction ratio of engine speed. Rotation of gear 15, merely spins the sun gear 14, shaft 2 and the free clutch plate 9 backward. However, with the vehicle load on carrier 26, planet gears 16 are required to spin forwardly, and with gear 27 stopped, the gears 16 rotate forwardly on their own centers, and also orbitally, requiring carrier 26 to rotate forwardly at a reduction ratio, proportional to the differential diameters of annulus 15 and sun gear 27. This permits the fluid unit to operate in its designed torque-speed ratio for highest efficiency, the heat losses being negligible. The low speed ratio of the gears is so taken with respect to vehicle load and engine power, that these conditions are satisfied, for all heavy gradient or traction work.

The transition between low and normal drive is quickly obtained by release of brake 30 and the coupling of clutch 9—11. For most practical purposes, brake 30 will be seldom used. It will be understood further that mutual interaction in the gear unit 14—15—16—27, with respect to the transfer of torque support between clutch 9—11 and brake 30, makes possible a maintaining of continuous torque during this interval, described in detail further.

It should be clearly understood that there is no forward drive until clutch 9—11 or brake 30 are engaged. The auxiliary forward drive is obtained by locking brake 30 to drum 28. If the torque capacity of the fluid unit is not sufficient to give a useful driving torque component to annular gear 15, application of the brake 30 will cause planet gear 16 to roll around the now fixed sun gear 27 so that with engine speed applied to impeller A1, carrier 26 rotates forwardly at low speed, there being two reduction ratios, that of the torque converter and that of the gear group 15—16—27, one superimposed on the other. This series drive is distinct from the parallel drive in which mutually reactive torque components are applied to carrier 26 and to output shaft 50 by annulus 15 from rotor B and by sun gear 14 by clutch 9—11.

The fluid torque converter or fluid unit of Fig. 1 upon circulation of liquid by impeller A-1, projects the liquid inward radially through output rotor B, giving up kinetic energy thereto as radius diminishes. The angular placement of the vanes of the reaction rotors R-1 and R-2 is such that they initially receive a backward component locking the roller clutches C-1 and C-2, while redirecting the liquid to impinge on the vanes of the auxiliary or secondary impeller A-2 and the primary impeller A-1.

The otherwise abrupt speed differential between the liquid issuing from the stopped reaction wheels and impellers running at engine speed is ameliorated by the action of freewheel clutch C-3, which may let A-2 run ahead faster than A-1. Since the entrance of A-1 is at a longer mean radius than A-2 its absolute velocity is higher and it is better suited to receive the liquid issuing from the stopped reaction member when the rotational speed of the body of liquid exceeds the rotational speed of the input members.

For example at near stalling speed, there is a high slip ratio from A-1 to B, and the velocity component of the fluid emerging from R-2 exceeds the absolute speed of A-2 and causes A-2 to spin ahead of A-1. At speeds upward of 1600 R. P. M. or around 40 miles per hour, the rotor A-2 may by design, be made to cause one-way clutch C-3 to lock, so that A-1 and A-2 both transmit impeller fluid force.

It may be stated that the input portion of the primary impeller A-1 is equipped with a nose wheel A-2 which can spin out of the way whenever the velocity component of the fluid from the reaction elements exceeds the desired inlet velocity of the primary impeller.

The circulation of fluid in the fluid unit of Fig. 1 is counterclockwise as indicated by the arrow, passing from primary impeller to output rotor, through the two reaction wheels, the secondary impeller, and returning to the primary impeller.

The differential velocities from wheel to wheel in a common circuit like this one are normally proportional to torque transmitted.

In accordance with design of blading, the conditions under which the reaction wheels R-1 and R-2 no longer receive reaction components, and are swept into forward rotation along with the other vaned members, are determined by vehicle speed and load torque and by engine speed and torque.

For example, at full throttle and at 1800 R. P. M., R-1 may freewheel forwardly, and at 3000 R. P. M., R-2 may freewheel forwardly, these relative speed points diminishing for part throttle settings. Being swept into forward rotation, they are free to run at some ratio below the speed of A-1 and B, the low differentials reducing the wheel-to-wheel shock losses otherwise present, and setting up a fluid circulation condition in which relative speeds of A-1 and B approach unity or 1-to-1 ratio, impressed upon annulus 15 and sun gear 14 to drive carrier 26 at approximately engine speed.

It should be understood that a variation of torque with speed occurs in the present internal combustion engine, and that when a fluid torque converter of the type described herein is constantly connected to a load applying mechanism, the torque converter torque capacity varies automatically with changes in the applied torques and speeds. This combination is therefore inherently adaptable to treatment in which the torque or horsepower curves of the engines are matched or equilibrated to the torque converter characteristics, enabling a differential speed or torque range of the torque converter to be chosen which provides a relatively high overall efficiency. This makes possible a self-adjustment of converter speed ratio inverse to variation in load torque, while the engine throttle setting may remain fixed; there being automatic adjustment of converter speed ratio with increased load torque, while the torque converter capacity value remains within the useful or efficient zone.

In changing down from parallel drive to series drive, the absence of torque shock in the gear unit is due to the transfer of torque from clutch 9—11 to brake 30 wherein no torque differential is applied to sun gear 30, consequently the converter in assuming all of the driving torque which was once split through clutch 9—11, may then rise to a speed ratio at which there is equilibrium between torque developed and torque demand from the load.

The fluid pressure for actuation of the clutch 9—11 is supplied from pump P' of Figure 5 through valve 90 of Figure 3, being delivered through line 67 to gland 63, and passages 61 and 62 to cylinder space 65. The presser plate 11 is an annular ring piston guided on pins 64 supported in the flywheel 3, and is returned to inactive position by clutch disengagement springs, shown at 12. The web 4a of the flywheel is shaped to form a seat between which and the ring 11, the clutch plate 9 is clamped by the fluid pressure action. Centrifugal force on the fluid to the left of web 4a tends to vent fluid out of the driven disc space.

In Figure 2, a brake band actuating mechanism is shown in section, as devised for the actuation of bands 25 and 30 of Figure 1, by individual servo cylinders and pistons. Pipe 80 receives pressure from the output port of valve 110 of Figure 3.

In Figure 2, the brake band 30 for drum 28 is anchored by locating stud 71 in a portion of the casing 60; and the movable end of the band is pivoted to thrust rod 72 seated in notch 73 of lever 74 also pivoted on the casing. The pressure from pipe 80 enters cylinder 75, moving piston 76 to the left, its rod 77 projecting to actuate the long arm of lever 74. When the pressure is released, the spring 79 disengages band 30 from the drum, and the spring 81 returns the piston 76 to the right. Pipe 82 leads from the left end of cylinder 75 to the sump to provide a cushioning effect upon release of pressure in pipe 80, this closed system preventing oil contamination by the atmosphere.

The reverse band 25 is likewise operated by a similar fluid pressure servo actuator, and it is not deemed necessary to show the duplicate fluid pressure servo means.

The valve 90 of Figure 3 selects operation of reverse brake band 25 or of clutch 9—11; the valve 110 selecting operation of brake band 30 when in the "up" position, and admitting pump line fluid pressure to valve 90 in "down" position.

The valve 110 of Figure 3 is seated in a bore of valve body 199 and has three bosses a, b, and c, its upper end protruding a sufficient distance so that a full stroke of arm 130 downward, will cut off the pump pressure from the connection by the ports 93 and 112, and while exhausting same at port 115 will deliver pressure from port 113 to port 111 open to brake cylinder line 80. Valve 90 is seated in a similar bore with three bosses a, b and c.

Spring 118 retained by a screw plug, presses the valve 110 upward and is deflected by downward motion of arm 130 as shown in Figure 3. The normal operating condition is for valve 110 to remain in the up position for both Automatic Forward drive and Reverse drive, being depressed for low drive when hand lever 200 is moved down and to the right as shown in Figure 4.

Valve 90 occupies three positions but cannot apply operative pressure for either Automatic—Forward or Reverse, unless valve 110 is in the normal "up" position.

For all practical purposes, valve 110 will be seldom used, therefore the control pattern places the auxiliary Low position at the end of the range of handlever movement upon normal Automatic running. The operator may by holding button 204 of Figure 4 freely depressed against spring 208, move the roller 206 entirely free of any cam track guides or stops and the vehicle may be rocked by skipping quickly through Neutral and Automatic between reverse and low, or by following the instructions given herein further.

Valve 90 has two delivery ports, 91 and 92b fed selectively from port 93 connected to port 112 of valve 110. Ports 94 and 95 lead to exhaust. In the mid-position boss b of valve 90 exhausts the pressure to prevent either the clutch 9—11 or the brake band 25 from being actuated.

Valve 110 of Figure 3 has two delivery ports 111 and 112, its inlet feed port 113 being connected to the pump line 102 of Figure 5. Port 114 is connected to exhaust at 94 and port 115 to exhaust 95. The pump line pressure in port 113 is delivered either to port 93 of valve 90 or to port 111 open to line 80 for actuating brake 30 of Figure 2. All exhaust ports connect to pressure relief outlet 116 draining the space under the valves to the sump indicated in Figure 5.

The flywheel starter ring 10 throws oil from the interior of casing 60 adjacent the flywheel, into a scoop 10a and passage 10b leading to the engine crankcase as indicated in Figs. 9 and 10. This expedient reduces fluid friction drag loss, and since the engine and transmission oil may be commonly used herein, a simple strainer arrangement in this closed system prevents clogging.

The pump P' of Figure 5 draws fluid from the sump and delivers it through a pressure regulating valve, V, to line 102, providing a steady line pressure in port 113 of valve 110 of Figure 3.

The method for obtaining regulated line pressure is described in Letters Patent to Earl A. Thompson, U. S. 2,193,304, issued March 12, 1940, in connection with Figures 19 to 22 thereof. Pump P' is driven directly from shaft 50 as indicated in Figure 1, and a similar pump P is driven directly from the engine. P may be the engine lubricating pump. In order to have available sufficient pressure for all operating conditions it is necessary to combine the pressure from two pumps, one driven by the engine, and the other by the output shaft, therefore non-return valve 104 seats to prevent pump P' from draining the passages connected to line 102, when shaft 50 is driven in reverse. It should be understood that clutch 9—11 or band 30 are to be actuated when the vehicle is standing still for the purpose of obtaining initial drive, therefore the pressure system should provide actuator pressure as soon as the engine is running, as well as for a towing start of a stalled engine, when coupling clutch 9—11 is required.

Figure 4 shows a typical valve controller for the device of the invention wherein the projection view is sectioned in part to provide a clear understanding of the cooperation. Handlever 200 is attached to a control sleeve 201 carried on the vehicle structure for rotational movement of sleeve and lever selecting the ratio positions by swinging of 200 about the center of 201.

Arm 202 of sleeve 201 is clevised to rod 203 connected to valve control arm 121 of Figure 4. Reciprocation of handlever 200 from its uppermost position down and to the right changes the valve settings from low to automatic to neutral and reverse, in that order. The button 204 slides in a cylindrical seat and is attached to rod 205 which carries a vertically projecting pin for roller 206 which intersects a cam track 207 in the under face of sector plate 210, shown in part section. The cam track 207 is contoured to guide and to stop the roller 206 in the various shift positions noted. The form of the cam track 207 may be taken to suit the operating conditions, so that for example, the button 204 need not be fully depressed against spring 208 for the normal forward to reverse shift, the roller 206 ratcheting between the stop positions; but for shifting to low, the roller may be moved over a blocking portion of the cam track 207, so that it may be latched fully for continued drive in low, without the driver holding the lever 201 against the spring force of the valve mechanism.

Lever 121 is moved rotationally by rod 203 from the motion of handlever 200. The lever 121 is fixed to shaft 123 mounted in a boss of the valve body 199, the other end of the shaft having affixed lever 130. The sleeve 122 is mounted to rotate about shaft 123, and has fixed to it lever 125 and valve operating arm 124. Hairpin spring 126 is curled around the sleeve with its ends secured in holes in the levers 121 and 125. Above the shaft, lever 121 has stop 121a which abuts stop 125a of lever 125, the effect of the hairpin spring being to hold the lower arms of the levers apart with the stops in abutment. Normal movement of the handlever 200 therefore causes the levers 121 and 125 to move together during the selection of reverse, neutral or automatic, while lever 130 swings freely. Upon counter-clockwise rotation of lever 121 beyond Automatic position, the valve arm 124 abuts against the upper face of the valve body 199 and is stopped; but because of the hairpin spring 126, lever 121 may continue to rotate far enough counterclockwise to cause lever 130 to depress the upper end of valve 110, for the purpose of exhausting the pump pressure from either of the feed ports 94 and 95 of Figure 3, and to connect the pump feed port 113 with the port 111 for actuating brake 30. For this operation, handle 200 is pulled down to its extreme lowermost position.

For various special types of operation, it may be desirable to provide a separate emergency control for actuating the Low brake 30, regardless of the setting of the handlever 200. This may be accomplished in various ways as for example, by the use of a separate element such as a lever 132 pivoted to strike the protruding valve 110, and operated from a rod 172 and lever 171. The spring 133 of Figure 4, may be tensioned by depression of pedal 170. This provides an extra facility in maneuvering not obtainable with the preceding described control, since it may be desirable for example, with the vehicle stuck in mud, sand or snow, to leave the handlever 200 in Reverse or Automatic position while rocking the car forwardly and reversely through simple depression and release of pedal 170.

It should be noted that the operator's hand on handlever 200 feels the additional force of spring 118 resisting the downward movement of valve 110 as well as the force of hairpin spring 126, so that he is warned of the drive condition. These springs are of low force value, to permit a latching action of button 204 and roller 206 in conjunction with the button spring 208. Various other arrangements utilizing these principles are possible, and may be chosen to suit the vehicle driving needs.

It should be understood that for towing a vehicle to start the engine a pump such as indicated at P', in Figure 5, driven by output shaft 50, provides pressure not available when pump P is not driven by the engine. The pressures of the two pumps is fed into a common outlet chamber such as shown in Figure 5, where passage 102a from pump P' enters the chamber, and passage 102b leading from pump P enters same, the final outlet of the chamber leading to regulator valve V.

The initial pressure from pump P' operates the check valve 104 and feeds to the chamber.

Valve 104 prevents reverse rotation of pump P' from sucking oil out of the chamber.

In this way, the engine driven pump P supplies pressure for starting, the output shaft pump for adding to pressure and for towing of the vehicle, thus supplying the valves 90 and 110 so that at no time when the engine or the vehicle are running will there be a lack of servo pressure, or lubrication pressure.

In order to assure a certain degree of overlap between operation of clutch 9—11 and brake 30, restriction ports in the exhaust passages leading out of port 94 and port 115 put a time dwell in the release of the clutch. The building up of pressure in cylinder 75 of brake 30 may occur quickly since the pumps P and P' are maintaining line pressure, while the release action of the springs of clutch 9—11 must oppose the orifice effect of either of the restrictions shown.

A further factor is the snubbing action of the band 30 on drum 28. When the vehicle is proceeding in "split-torque" drive, that is, with clutch 9—11 engaged, the carrier 26 is at output speed, sun gear 14 is at engine speed and annulus gear 15 may be at engine speed or at a much lower speed, even rotating reversely. The idling sun gear 27 is controlled in part by the spinning of the planets 16. If 14 and 15 are at the same speed, of course 27 has forward rotation. If 14 is standing still, the planets spin reversely and 27 is still idling forwardly. If 14 is rotating reversely, 27 is yet idling forwardly. The drum 28 under "split-torque" drive has a forward spin which brake 30 endeavors to stop. The arrow in Figure 2 shows this normal forward spin. The "hand of rotation" of band 30 with respect to the anchor 71 and the movable end is such that the band will self-lock when drum 28 has a negative or reverse reaction component. This cannot occur until the exact instant sun gear 14 is declutched and all torque is thereafter derived from annulus 15. Whatever timing lag there may exist because of inertias is taken care of by the permitted minute slip of the friction surfaces of the clutch or brake.

Since band 30 is already loaded by the pressure in cylinder 75 on piston 76, the arrival of the reverse reaction component on drum 28 is anticipated, and the band instantly self-locks at approximate zero speed without drive shock. This is a split-second interval.

It will be seen that on shifts from "split torque" to series reaction drive, the device is safeguarded from there being an appreciable no-torque interval, which otherwise would permit the power-connected parts to idle at high speeds, which is undesirable. This cooperation of clutch and brake controls has therefore two overspeed safeguards, and this is considered to be a useful feature, since it enables the operator under heavy going, to shift to auxiliary Low at once, without being concerned with torque reaction effects or with high idling over-speeding of the engine and connected parts. The absence of torque on either of the mutually reactive sun gear 14 or annulus gear 15 would otherwise permit the other member to run away.

Upon shift to engagement of clutch 9—11 with release of brake 30, valve 110 promptly drains brake cylinder 75 so that piston 76 is retracted, and clutch 9—11 is simultaneously fed from port 91 of valve 90 of Figure 3. However, a dwell of self-locked brake 30 occurs, during the interval when torque is still being transmitted by annulus gear 15, before the energization of clutch 9—11 can relieve the drum 28 of its reaction locking component. This dwell is not terminated until clutch 9—11 begins to apply engine speed to gear 14, whence band 30 unlocks from drum 28.

The cooperation of the clutch and brake with the dual input element transmission gear unit is effective to prevent an appreciable no-torque interval, therefore, for both shifts of engagement of the clutch 9—11 and brake 30.

This novel arrangement protects the drive from damaging shocks and unpleasant gear and engine noises, and is believed unique in this presentation.

Figure 6 shows the placement of the invention in a vehicle, the handlever sleeve 201 being bracketed to the right of the steering column for convenience of lever 200 to the driver's hand below the steering wheel. The floorboards are shown supporting the accelerator pedal 180 operating throttle rod 181 and throttle 182, and the shift pedal 170 with lever 171 and rod 172 pivoted to operate lever 132 pivoted on the valve body 199 for depressing valve 110 of Figure 3 to establish Low gear drive, and to release same when the pedal is retracted. The arm 202 and rod 203 operate valve lever 121 as shown in Figure 4. The pump P is shown as mounted on the engine E with feed pipe 92 leading to valve body 199, port 113 of Figure 3.

The modification of Figure 7 substitutes the button 190 and lever 191 for the separate pedal control of valve 110 of Figures 4 and 6. In Figure 7 the accelerator pedal 180 at a given advanced position strikes button 190, depressing it to rock bellcrank lever 191 against spring 192 and shift the rod 172, to depress valve 110 to Low brake position. The pedal striking point is regulated by the adjustment screw-and-nut 193 which acts as a stop for the lifting force of return spring 192. The adjustable 2-part bushing has lower portion 193 fixed to the floor board and upper portion 193a which may be unscrewed to proper striker distance for the head of rod 199. This enables the operator to obtain automatic downshift to low at a throttle pedal point preceding full throttle, at full throttle, or beyond same, as desired, while retaining the facility therefor afforded by Figure 4 arrangement.

In Figure 8 the dual combination of accelerator pedal and auxiliary shift pedal for changing to Low is given in schematic projection. The lever 171 of pedal 170, instead of connecting directly to rod 172, is bent to intersect the motion of bellcrank 191 of Figure 7, so that the operator may shift to Low at low throttle opening, the juxtaposition of the pedals 170, 180 making it possible to hold the drive in Low while rocking the foot laterally to advance the engine speed. Springs 192, 133 serve to return the Low shift pedal operating mechanism to inactive position. This is for a drive in which the operator may be required to use his hands for steering and other purposes, such that manipulation of the handlever 200 would be difficult. In agricultural machinery, military vehicles and similar special purpose drives, controls of this character are required for easy maneuvering. In ordinary passenger car work the handlever and advanced accelerator pedal disclosures of Figures 4 and 7 are adequate, and the coordinating arrangement of Figure 8 is not necessary to comfortable operation.

*Operation*

The driving operation of the vehicle equipped with this drive is quite simple. The handlever 200 of Figure 4 is placed in Neutral and the starting of the engine pump P creates pressure in servo line 102 of Figures 3 and 5, where the boss b of valve 90 blocks the feed of servo pressure when valve 110 is in the "up" position, therefore there is no servo actuation of any brake or clutch. The engine may be raced or warmed up, and since the converter elements are unloaded, the connecting parts may idle freely.

Moving the handlever 200 to Automatic, lowers valve 90 to feed pressure to clutch cylinder 65 through line 67 and connecting passages. The clutch 9—11 engages sun gear 14 to rotate at engine speed, while the variation of the engine throttle such as indicated in Figure 6 varies the speed of impeller A-1, and consequently the torque component of rotor B, applies a variable torque to annulus gear 15, which added to that of sun gear 14 starts the drive of the vehicle from rest. Torque reaction has locked the rotors R-1 and R-2 against reverse rotation and a torque multiplying effect is created within the working space of the torque converter. The rise in impeller and rotor speeds serves to accelerate annulus gear 15 forward until it approaches the speed of sun gear 14. At some chosen torque and speed relationship the reaction rotor R-1 may begin to freewheel forwardly, and at some higher value the reaction rotor R-2 may likewise freewheel forwardly as described preceding. At some chosen point the auxiliary impeller A-2 is no longer idling at a higher speed than A-1, but is locked to rotate with the latter, both then transmitting impeller force. For general purposes the locking of A-2 to A-1 preferred to occur at a speed and torque point lower than those at which the reaction rotors begin to freewheel forwardly.

It is seen that during the normal automatic operation, the driver merely changes the engine throttle setting to vary the torque of the engine, in accordance with the driver's desire for vehicle speed, and upon relaxing of the throttle, the rotors R-1, R-2 being free to find their proper forward speed, thereby permitting an efficient reverse circulation impelled by the turbine member B, which action provides a measurable amount of engine braking.

Under heavy going, the operator may shift the handle 202 into Low, which as described, cuts off the pump pressure from the clutch 9—11 and applies the servo line of pressure to the brake cylinder 75 of Figure 2 for actuating brake 30. This causes sun gear 27 to stop and establishes low gear drive through rotation of annulus gear 15 applying a reduction ratio to output carrier 26. During this regime, a double reduction of speed ratio occurs since the torque converter is now delivering all of the engine torque, at a reduction ratio.

Return to normal Automatic drive is achieved by merely shifting the handle 200 back to Automatic position, releasing brake 30 and applying clutch 9—11.

The auxiliary method of enforcing series drive at double reduction described in connection with Figures 6 and 7 simply requires the operator to leave the hand lever alone, and hold the pedal 170 in down position. This operation applies a thrust to rod 172 rocking lever 132 and arm 173, depressing the valve 110, enabling the operator to return quickly to the preceding drive condition by taking his foot off of pedal 170. The modification arrangement shown in Figure 7, eliminates the need for pedal 170 and applies the down shift operation to the accelerator pedal 180. At extreme accelerator position when the engine throttle is nearly or actually wide open, the Automatic downshift to auxiliary Low is thus obtained. A double pedal control which combines both the operations of Figures 6 and 7, is shown in Figure 8, and gives the operator optional selection of down shift to Low by either pedal movement without moving the hand lever, but this last modification would rarely be required since the hand lever 200 is convenient to the operator for all ordinary downshift requirements, without the added complications of the extra mechanisms.

It is deemed of unique value to be able to control downshift to Low by both the pedal and the handlever, and the accelerator pedal interlinkage providing this facility is believed to furnish adequate drive control selection between two automatic speed ratio ranges of a torque converter without the complication of governor devices in automatic shifts.

In shifting to Reverse the handlever 200 is moved upward towards the left in order to place the valve 90 in position to admit pressure to the line 96 for the servo cylinder, not shown, for brake 25. As described preceding, this operation may proceed by shift of the handlever from Neutral to Reverse position, or the handle may be left in the Reverse position while auxiliary shift pedal 170 is depressed for forward drive and released for return to Reverse drive. This latter facility is believed to be novel and useful especially for the maneuvering of heavy vehicles operating in muddy, sandy or snow-covered terrain.

The foregoing description of operation provides the fundamentals for the driving structure herein described, and outlines their advantages. It is thought useful to have a single connection between the valve body mechanism and the hand lever for all normal shift control operations. The emergency control for valve 110 may be linked by Bowden wire, fluid column and electrical circuit or any other equivalent force transmitter such as is well-known in this art, for which herein no claims are made as to novelty in such substitution.

The preceding description encompasses a number of novel features among which are the arrangement of the drive elements for providing successive parallel and series torque multiplication and the cooperating clutch and brake controls which make that operation possible, while eliminating torque shock during the transfer period; as well as the extremely simple control mechanism described above in combination with the actuation means.

It is believed clear that a number of interrelated features of novelty embodying inventive combinations are disclosed herein. The invention provides a simple, useful, and effective means for obtaining a wide range of torque multiplications in a combined fluid and gear drive, controlled by fluid pressure, with valving arranged to pick out the shift functions required which positively eliminate undesired shift characteristics, inherently yielding a factor of safety against wrong motion. Changes may be made in the specific arrangements of structures embodying the teachings disclosed herein without departing from the spirit and scope of my invention, which is set forth in the appended claims.

I claim:

1. In power transmissions, the combination of a variable speed engine and primary shaft driven by said engine, a driven shaft, a fluid torque converter with an impeller member, output rotor member, and a plurality of reaction members, a planetary gear unit consisting of a plurality of relatively rotatable elements two of which are permanently fixed to said driven shaft, namely a carrier and an annulus gear; a coupling clutch located between said primary shaft and a third sun gear element of said gear unit, a coupling means located between said rotor member and two additional sun and annulus gear elements of said gear unit, means effective and operative to allow forward and prevent backward rotation of said reaction members, and control means operative to couple said clutch and cause the primary shaft element and one of said additional elements to combine a variable torque delivered to one of said driven shaft elements under speed increase of said engine during which operation the said rotor member is initially locked against backward rotation and is subsequently rotated forwardly.

2. In power transmissions, the combination of an engine, a driving shaft, a driven shaft, an intermediate transmission shaft, a coupling clutch between the driving shaft and the intermediate shaft, a hollow shaft, a compound planetary gear unit consisting of a first group having a sun gear driven from the intermediate shaft meshing with planet gears supported on a carrier fixed to said driven shaft, an annulus gear meshing with the said planet gears and attached to said hollow shaft, and of a second group consisting of a sun gear attached to the hollow shaft, an annulus gear fixed to said carrier, planet gears meshing with said last named sun gear and annulus supported on a second carrier, a torque-reaction sustaining member for each of said units, a fluid torque converter having an impeller driven by said engine, a driven turbine connected to said hollow shaft, and reaction members arranged to redirect fluid outflow from said turbine to said impeller, and control means to vary the speed and torque of said engine and said converter and to vary the action of said members and said clutch, the arrangement producing the result that during the interval when the said clutch is being engaged, the initial rotation of the said turbine is in reverse followed by forward rotation, the effect providing a useful range of infinitely variable resultant speed on the said driven shaft carrier up to approximate one-to-one speed ratio between input and output shafts.

3. In power transmissions, the combination of an engine shaft, an output shaft, a fluid torque converter unit driven by said engine shaft having an impeller, reaction means and an output rotor, a clutch driven by said engine, a forward driving planetary gear unit consisting of two compounded planetary groups having a sun gear of one group coupled to said engine shaft by said clutch, an annulus gear of said group coupled to said rotor a shafting connecting said annulus gear with said rotor and having affixed thereto a sun gear of the other of said groups, a carrier rotating with said output shaft supporting planet gears meshing with said sun and annulus gears of said first named group, a second sun gear of said first group meshing with said planets and having a reaction drum, a brake for said drum, a second group of said unit consisting of a carrier supporting planet gears meshing with said second named sun gear and meshing with an annulus gear rotating fixedly with said first group carrier and said output shaft, and control means for said clutch and said brake effective to alternate their engagement so as to provide divided torque drive when said clutch is engaged and series drive of said fluid unit with said gear unit when said clutch is disengaged and said brake is applied to said drum.

4. In the combination set forth in claim 3, the further combination of said second-named planetary gear unit driven by said shafting and driving said output shaft thru said second group annulus having a reaction member adapted to be held by a second brake when said forward drive planetary brake and said clutch are released, in order to provide reverse drive between said shafts.

5. In torque-dividing and combining drives, the combination of a power shaft, a load shaft, a compound planetary gear unit composed of two simple planetary gear groups each consisting of sun, annulus and meshing planet gears supported on a carrier, said two groups providing forward and reverse reduction drive of said load shaft, and embodying a dividing train composed of a fixed ratio gear connection to said power shaft established or released by operation of a coupling clutch and a variable ratio gear connection, a continuously variable ratio drive between said power shaft and the variable ratio gear of said unit providing inherent increased torque capacity with speed increase; the said fixed gear and variable ratio gear connections having a combining train drive to said load shaft, the train having two input gear elements connected respectively to said fixed ratio gear connection and to said variable ratio gear connection for simultaneous delivery of the torque components of the dividing train to said load shaft, the disengagement of said clutch causing interruption of torque between said shafts while with the engagement thereof establishing direct coupling in said fixed ratio connection and indirect reactive coupling in said variable ratio connection.

6. In power drives, a power shaft, a load shaft, a fluid torque converter providing a hollow toroidal working space for fluid to be circulated therein in a helical path, a section of which defines a kinetic path of motion, said converter including a primary impeller connected to the power shaft for initiating the kinetic flow of said fluid in said working space, an output rotor directly following said impeller in the said kinetic path and arranged to absorb energy from the fluid developed by said impeller, an auxiliary impeller preceding said primary impeller in the said kinetic path and adapted to rotate at faster speed than the said primary impeller during a high rate of flow of said fluid and to rotate at the same speed during a period of lesser flow rate of said fluid, a one-way clutch operative to lock said impellers together during said lesser flow rate interval, reaction rotors following said output rotor in said kinetic path adapted to reverse the angle of flow of said fluid and to deliver an accelerated flow thereof, said reaction rotors being located at a lesser radial distance than said impeller or said output rotor and preceding said auxiliary impeller, the arrangement of said impellers and rotors providing a variable speed drive of said output rotor approaching one-to-one ratio, and additional driving means driven by said output rotor and driving said load shaft consisting of a reverse drive and torque-combining gear unit which includes a plurality of gear drive trains and a coupling clutch adapted to provide a divided and recombined forward torque drive between said shafts thru said torque converter, and to provide series reduction forward and reverse drive by said torque converter, to thereby establish two forward modes of operation of said means alternatively, one for normal forward drive and the other for auxiliary reduction drive and a third mode series reverse drive being established by a reverse drive actuator separately providing torque reaction for one of said trains.

7. In power drive controls, a power shaft, a load shaft, drive means coupling said shafts comprising a continuously variable transmission unit constantly connected to said power shaft, a clutch adapted to couple to said power shaft, a transmission assembly embodying forward and reverse reduction drive gear groups, the said forward gear group having an annulus gear input element constantly driven by said variable transmission unit, a second sun gear input element of said gear group coupled to said power shaft by said clutch and an output planet carrier element driving said load shaft; the said reverse gear group having an output element coupled to said load shaft, an input element driven by the output of said variable unit, and a reaction planetary carrier, and drive establishing means effective to actuate and release said reaction elements and said clutch in a selective pattern so as to cause parallel operation of said unit and said assembly for normal forward drive between said shafts and effective to cause series reduction drive in forward or reverse of said unit and said assembly alternatively, and control means for said first named means operative to select said parallel or series drive.

8. In the combination set forth in claim 7, the further combination of said drive-establishing means each having a fluid pressure servo actuator for energising same, a source of fluid pressure, and valving operated by said control means for selecting the actuation of said members in a pattern of drive such that the said valving provides control of said actuation effective to determine said selective alternate forward or reverse series drive for one selected range of valve settings and to determine said parallel drive in a separate setting.

9. In power control devices, in combination, a power shaft and a load shaft coupled by a fluid torque converter having an impeller member driven by the power shaft and a rotor for transmitting drive to said load shaft, a combining gear unit consisting of two planetary gear groups for forward and reverse drive, having one input element driven by said rotor and connected to drive said load shaft, said planetary reverse gear having one element connected to drive said load shaft and an element driven likewise by said rotor, a coupling sleeve driven constantly by said rotor and driving the said input element of said combining unit and driving the input element of said reverse gear, a reaction element for said reverse gear, a reaction element for said combining gear unit, and actuation means for said elements operative to establish selective reverse drive of said load shaft by said reverse gear, or to establish combined drive by said combining gear unit.

10. In power control devices, in combination, a power shaft and a load shaft coupled by a fluid torque converter, a torque combining planetary gear unit and a planetary reverse gear unit, an input ring gear for said combining unit and an input element for said reverse gear unit, a coupling sleeve driven constantly by said torque converter and driving the ring gear of said combining unit, said sleeve likewise driving the input element of said reverse gear unit, reaction elements for said combining and reverse gear units, and actuation means including a plurality of actuators selectively operative to establish reverse drive through said reverse gear unit, or forward drive through said combining unit.

11. In the combination set forth in claim 10, the further combination of fluid pressure means to operate said actuation means and to hold same in drive-engaging positions by admission of fluid pressure from a fluid supply source by valving, and of manually operable mechanism effective to select the operation of said valving.

12. In power drives and controls, in combination, power and load shafts, automatic variable speed transmission means coupling said shafts and adapted to deliver power to said load shaft in accordance with torques and speeds determined by the torque capacity of said transmission means, said means consisting of a fluid torque converter with an impeller constantly connected to said power shaft and having an output rotor, a reverse gear unit with one element operative to drive said load shaft and an input element, a forward driving combining gear unit having one element operative to drive said load shaft and two input elements one of which is constantly connected to said rotor and to said reverse gear input element, a clutch operable to connect the other of said combining gear unit input elements with said power shaft, drive ratio establishing mechanism for said combining gear unit, the stated arrangement being effective to divide and recombine torque in one range of operation of said combining gear unit as determined by actuation of said clutch and to provide series multiplication of torque in another range as determined by actuation of said mechanism, a plurality of actuatable members for making said means effective by operation of said clutch or said mechanism a fluid pressure source and a regulating means for maintaining same at a predetermined pressure level, fluid servo actuation means operative singly upon said members to provide normal automatic variable ratio drive between said shafts, and to provide auxiliary low speed ratio or reverse drive therebetween, selective valving for delivering the pressure from said source to said actuation means, and controls for said valving and said actuation means providing a selection of one or another of two automatic ranges for forward drive.

13. In power drives, a variable torque engine driving a power shaft, a load shaft; a fluid torque converter having a plurality of impellers adapted to be driven by said engine, a plurality of reaction rotors and an output rotor receiving the outflow of said impellers so as to develop a kinetic torque multiplication drive approaching one-to-one ratio, a torque combining gearing unit having one input element driven constantly by the output rotor of said converter, having a second input element, and having two output elements connected to drive said load shaft; a clutch operative to establish initial drive through the second input element of said gearing unit and effective to cause said rotor to rotate reversely when said load shaft is standing still, the reaction of said reverse rotation of said rotor being opposed by a forward fluid-transferred component developed by increased rotation of said engine which forward component overcomes the reverse rotation caused by engagement of said clutch at a predetermined differential torque applied to the said input elements of said gearing when the said rotor ceases rotation and rotates forwardly until its speed closely approaches that of the said impeller, and one-way clutches for said reaction means effective to provide torque reaction for torque multiplication drive by said torque converter and to permit the reaction means to be coupled into the kinetic circuit of said converter at predetermined speeds and torques of said shafts.

14. In power drives and controls, in combination, power and load shafts, a continuously variable torque-multiplying transmission connecting the shafts and operable to transmit drive between said shafts under selected divided torque and series torque conditions, said transmission including a coupling clutch, having one member rotating with said power-shaft and a second member rotating with a power-applying element of said transmission, gearing in said transmission providing plural torque paths, and a reaction brake operable to establish the drive of one of said torque paths, the said transmission providing said divided torque operation when said clutch is engaged and providing said series torque drive operation when said clutch is released and said reaction brake is applied, a reverse drive gear arranged parallel to the series torque drive of said transmission and normally idling during forward drive, a reverse reaction brake adapted to establish reverse drive between said shafts by said reverse gear, and actuation means for said clutch and said brakes operative to provide divided torque drive when actuating said clutch and series forward or reverse drive when actuating one of said brakes.

15. In power drives and controls, an engine shaft, a load shaft, a continuous torque multiplying unit driven from said engine shaft constantly connected to one input element of a fixed ratio gear unit, an output element for said gear unit connected to said load shaft, a coupling clutch for connecting the engine shaft to another input element of the said gear unit and effective to establish divided torque between said engine shaft and the input elements of said unit during the interval of which the speed of said load shaft has a variable differential ratio with respect to that of said input element and the speed of said second input element, a reaction element for said unit brakable to obtain reverse drive and a reaction element for said gear unit brakable to establish forward reduction drive of said output element by preventing rotation of said reaction element, a reverse reaction brake and a reaction brake for the forward drive reaction element of said unit, and an actuation arrangement common to said brake and said clutch effective to couple and uncouple said clutch so as to provide a shift interval for alternate torque support by said brake or clutch during which interval constant torque between said shafts is maintained said arrangement being connected for interruption of such operation when said reverse reaction brake is made effective.

16. In power drives and controls, the combination of an engine shaft and a load shaft, a combining gear unit having an output element connected to said load shaft and having two mutually reactive input elements arranged to apply a variable torque to the said output element, a reaction element for said unit operative to establish reduction drive of said output element, a self-wrapping braking means for said reaction element consisting of an encircling band effective to lock same against rotation when torque reaction is applied to the reaction element in one direction due to the self-wrapping actuation of said brake, a fluid torque converter constantly connecting said engine shaft and one of said input elements, a second path of torque between the said engine shaft and the other of said input elements of said gear unit including a friction clutch engageable to establish combined torque in said gear unit, and controllable actuation means coordinated for alternate actuation of said clutch and said brake operative when said clutch is disengaged and said brake applied to provide a dwell of torque capacity between said shafts until said brake self-wraps to stop rotation of said gear unit reaction element.

17. In power transmissions, a combining and reversing planetary gear unit consisting of a group having two input elements, a reaction element, and an output element connected to said load shaft; and of a reverse group having an output element common with the output element of said first group, an input element common with one of the input elements of said first group, and a separately operated reaction element for the group, the first reaction element being actuable for low forward drive of said load shaft and the other for reverse drive thereof, a fluid torque converter having an impeller driven by said power shaft and an output rotor driving the said common output elements, a coupling clutch adapted to connect said power shaft with the other of said first group input elements, and control and actuation means for both said clutch and said first-named forward drive reaction element operative to alternate their drive control action in establishing divided torque drive by the said torque converter and said clutch, or series drive by said torque converter and said first gear group.

18. In power transmissions the combination of a variable speed engine and a primary shaft driven by said engine, a fluid torque converter with an impeller, an output rotor and a plurality of reaction members, a compound two-unit, planetary forward and reverse gear with two elements connected to a driven shaft, two elements connected to a common input sleeve driven by the said output rotor and separately actuable reaction elements providing low forward and reverse drive of said driven shaft by the said compound unit, a coupling clutch arranged to transmit drive between said primary shaft and a third input element of said gear, one-way acting means effective to permit forward and prevent backward rotation of said converter reaction members, and control means operative to couple said clutch and to deliver a variable torque delivered to the said third one of said input elements during speed increase of said engine during which operation the said members are initially locked against backward rotation and subsequently rotated forwardly.

19. In power transmissions, the combination of an engine, a driving shaft, a driven shaft, a hollow shaft, an intermediate transmission shaft, a coupling clutch between the driving shaft and the intermediate shaft, a compound planetary gear unit comprising two planetary groups one of which has a gun gear driven from the said intermediate shaft and having an annulus gear, the other of which has a sun gear driven from said hollow shaft and constantly coupled to said annulus gear, a second annulus gear of said second group, a carrier for said second group supporting planet gears meshing with said second-named sun gear and annulus, a fluid torque converter with an impeller driven by said driving shaft and a driven rotor coupled to said first annulus gear, a planetary carrier coupled to said driven shaft and supporting planet gears meshing with said first-named sun gear and annulus of said first-named group, a reaction sun gear for said first-named group means to prevent rotation of said second group carrier, actuation means for said means and holding means for said reaction sun gear, and control means for said engine, said coupling clutch and said actuation means effective when the said coupling clutch is engaged, to cause the rotation of said driven rotor to reverse followed by forward rotation of said rotor whereby to provide an infinitely variable resultant speed on the said planetary carrier up to an approximate one-to-one speed ratio between said input and said output shafts.

20. A power transmission for motor vehicles, including a power shaft, a load shaft, a clutch adapted to transmit drive from said power shaft, a fluid torque converter adapted to transmit drive from said power shaft, a primary planetary gear group consisting of two units including sun, annulus and planet gear elements supported on a common carrier and adapted to provide reduction speed drive and coupled differential drive of said load shaft, said carrier being the output element connected to said load shaft, an annulus being the reaction element, and two input elements one of which is commonly attached to an annulus gear and is coupled to the output of said converter and the other of which is a sun gear coupled to said power shaft by said clutch; a secondary planetary group adapted to provide reverse drive of said load shaft embodying an output annulus gear element coupled to said load shaft, a reaction carrier element, and an input sun gear element connected to the drive from the output of said converter; means to actuate said reaction elements and said clutch singly and individually for providing low speed reduction drive in forward or reverse of said load shaft and to provide clutch-coupled drive thereof, and control means operative to select said individual actuation.

21. In power drives and controls, the combination of an engine operable at variable speed and torque and connected to drive a primary shaft, an intermediate shaft, a driven shaft, a clutch coupling said primary shaft to said intermediate shaft for transmitting a torque divided from said engine output, a fluid torque converter driven by said engine and having an output rotor adapted to transmit a variable divided torque equal to the difference between the full engine torque and that transmitted by said clutch, a reverse drive and combining gear having an output member driving said driven shaft and having two input members operable at differential speeds during forward reduction drive, these input members being connected respectively to said intermediate shaft and said torque converter output rotor, actuating means operable to engage said clutch for initiating the said torque-dividing action, the said gear finally providing effective forward one-to-one torque between said primary and driven shafts in accordance with a predetermined increase of said engine speed and torque and braking means for said second named of said combining gear input members operable to stop said member and thereby provide reverse drive reaction within said gear.

22. In power drives the combination of an engine, a driving shaft driven thereby, a driven shaft, an intermediate shaft, a drive transmitting assembly adapted to couple said driving and driven shafts consisting of three transmission units, one being a fluid torque converter having an impeller member driven by said engine, an output rotor member, two reaction rotor members independently rotatable forwardly, and an auxiliary impeller member, the members being arranged in the normal direction of fluid flow in the stated order, separate one-way locking devices for said reaction members arranged to prevent backward rotation thereof, the said fluid torque converter providing infinitely variable speed ratio increase from stall torque to approximate one-to-one drive between said impeller and output rotor members; a second unit, the second of said units consisting of a plurality of meshing gears including planet gears supported on carriers, said plurality consisting of three compound gear groups, a primary group including a driven-shaft-connected carrier for planet gears meshing with an annulus gear driven by said output rotor through said intermediate shaft, and a meshing sun gear, a clutch for connecting said sun gear to said engine; a secondary group including an annulus gear connected to said driven shaft, a sun gear connected to said first-named annulus and intermediate shaft, and a reaction carrier supporting planet gears meshing with said last named sun gear and annulus; and a third group including said carrier connected to said driven shaft supporting planet gears meshing with a reaction sun gear, the stated arrangement providing one range of forward drive when the converter furnishes variable torque while said clutch provides a second variable torque component, for obtaining one range of combined variable torques and speeds of said driven shaft thru the torque combining action of said second unit.

23. In the combination set forth in claim 22, the subcombination of a control mechanism for said clutch and for the sun and carrier reaction elements of said groups operable selectively to engage said clutch or to brake one of said reaction elements, the control providing divided torque drive between said units when said clutch is engaged, and series drive therebetween when either of said reaction elements is made operative.

OLIVER K. KELLEY.

REFERENCES CITED

The following references are of record in the file of this patent:

UNITED STATES PATENTS

| Number | Name | Date |
| --- | --- | --- |
| 1,900,118 | Lysholm | Mar. 7, 1933 |
| 2,034,429 | De Lavaud | Mar. 17, 1936 |
| 2,149,117 | Dodge | Feb. 28, 1939 |
| 2,193,305 | Thompson | Mar. 12, 1940 |
| 2,277,214 | Dodge | Mar. 24, 1942 |
| 2,324,713 | McFarland | July 20, 1943 |
| 2,332,593 | Nutt | Oct. 26, 1943 |
| 2,343,955 | Cotterman | Mar. 14, 1944 |
| 2,353,905 | Kelley | July 18, 1944 |
| 2,372,817 | Dodge | Apr. 3, 1945 |